Jan. 31, 1928.
V. A. MATSON
1,657,862
SANITARY FRUIT BOWL
Filed Nov. 8, 1926
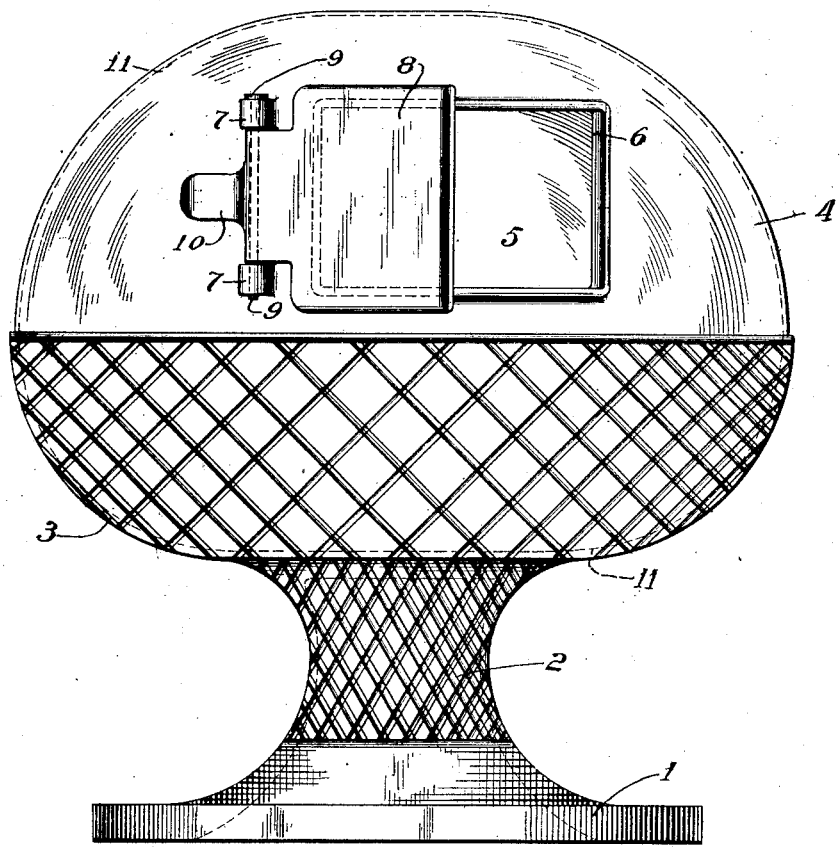
Inventor:
Victor A. Matson
By: Charles Turner Brown,
Atty Patented Jan. 31, 1928.

1,657,862

UNITED STATES PATENT OFFICE.

VICTOR A. MATSON, OF CHICAGO, ILLINOIS.

SANITARY FRUIT BOWL.

Application filed November 8, 1926. Serial No. 147,044.

This invention relates to a bowl in which fruit or other edible articles may be exposed to view in homes, restaurants, delicatessens, confectionery and fruit stores.

Among the objects of the invention are to obtain a fruit bowl in which the contents are protected from insects, dust, and other unsanitary influences and conditions. An additional object is to obtain a fruit bowl of the kind named in which the contents are exposed to view, and selected articles contained therein may be readily removed therefrom. An additional object is to obtain a sanitary fruit bowl which is ornamental in appearance and adapted to be placed on tables and side boards in homes, and on tables, counters and shelves in other places.

In the drawing referred to I have illustrated, in elevation, a sanitary fruit bowl embodying this invention, with a door forming an element thereof partially opened.

1 represents the base of the fruit bowl. 2 represents a standard supported by base 1, and 3 the lower portion of a bowl, which supported by standards 2. 4 represents the upper portion of said bowl, and 5 an aperture in portion 4. 6 represents a bead or flange which extends around aperture 5. 7 represents posts, or pedestals, and 8 a door which is illustrated as pivotally mounted between said posts 7 by means of pintle 9. 10 represents a thumb piece on door 8, by means of which said door may be turned on its pintle. 11 are broken lines which indicate the interior face of parts 3 and 4 of the bowl.

I have illustrated base 1 and part or portion 4 of the device as made of clear glass and the pedestal 2 and part 3 as made of pressed or cut glass; but it is optional as to what, if any, portion of the bowl is made of pressed or cut glass. The part 4 of the bowl should be made of clear glass to enable the contents of the bowl to be seen therethrough. The door 8 may, also, be made of clear glass, or, if preferred, of metal. If said door is made of metal it is preferably made of gold or silver, or plated therewith.

The purpose of the bead 6 is to obtain an upper edge in a plane, against which the door 8 is in contact when said door is closed.

The bowl is preferably made of glass, base 1, standard 2 and parts 3 and 4 being integral, and the abutments 7 are also, preferably of glass integral with the bowl.

I prefer to make the door 8 of clear glass, so that the contents of the bowl may be viewed therethrough, as well as through the clear glass wall of part 4.

I claim:

A base, and a hollow bowl, said bowl provided with a clear glass portion and with an aperture therethrough, in combination with posts integral with the walls of said hollow bowl and a member movably mounted on said posts to control the opening formed by said aperture.

VICTOR A. MATSON.